Patented Sept. 28, 1937

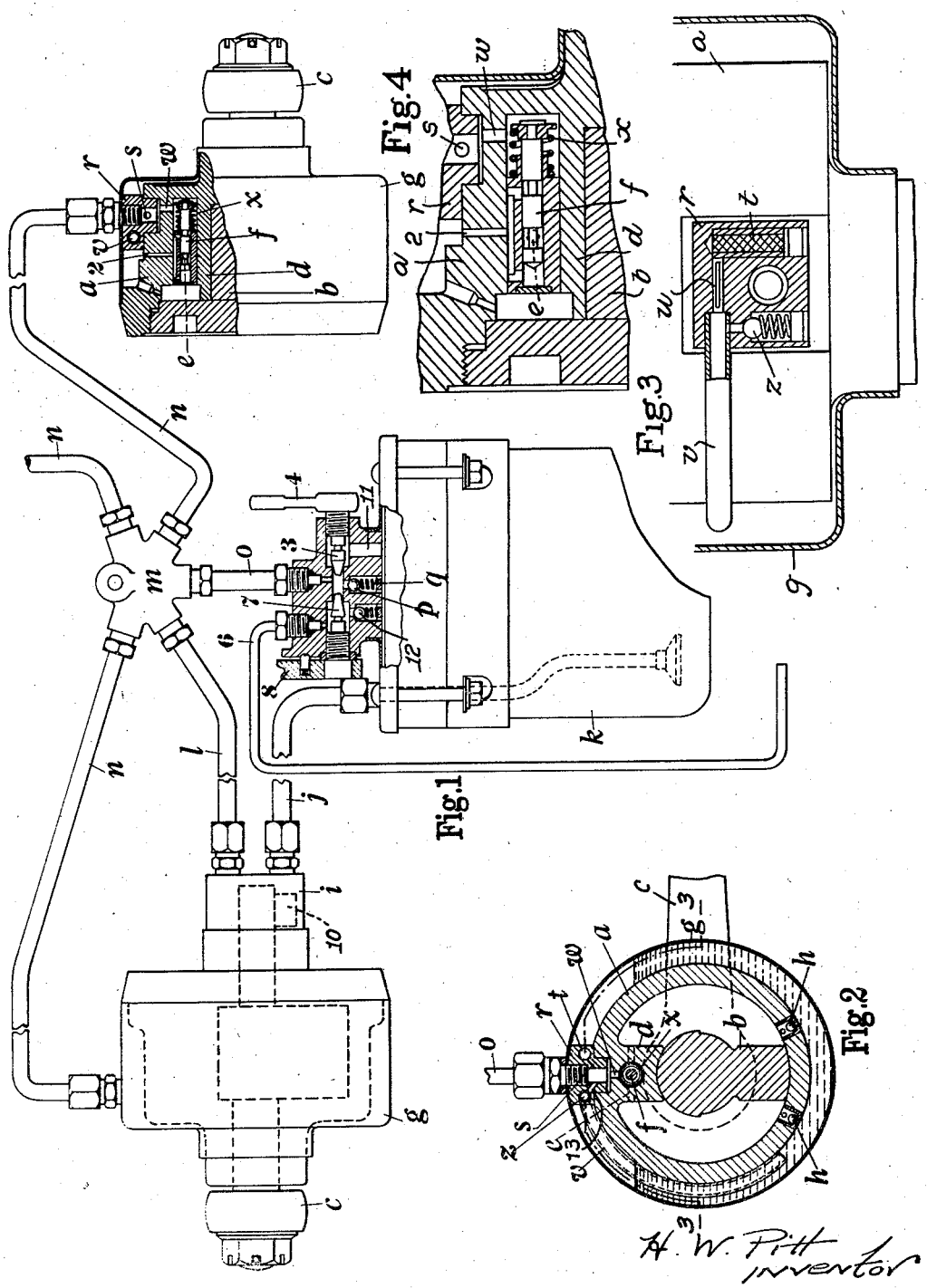
Sept. 28, 1937.  H. W. PITT  2,094,301
SHOCK ABSORBER FOR MOTOR VEHICLES
Filed Aug. 18, 1936

2,094,301

UNITED STATES PATENT OFFICE 2,094,301

SHOCK ABSORBER FOR MOTOR VEHICLES

Herbert Winchester Pitt, Birmingham, England, assignor to Joseph Lucas Limited, Birmingham, England Application August 18, 1936, Serial No. 96,665
In Great Britain September 10, 1935

3 Claims. (Cl. 188—87)

This invention relates to liquid controlled shock absorbers for motor vehicles, and has for its object to provide improved means for automatically maintaining the charge of liquid in all the shock absorbers used on a given vehicle.

The invention comprises a system in which a pump is combined with one of the shock absorbers, or is actuated by relative movements of a road wheel axle and the frame of the vehicle, and in which all the shock absorbers are supplied by the pump with liquid drawn from a common container.

In the accompanying sheet of explanatory drawings:—
Figure 1 is a part sectional elevation showing part of a system provided with this invention, this figure showing a pair of shock absorbers, a fluid container, and a pump combined with one of the shock absorbers.
Figure 2 is a cross section through one of the shock absorbers, and Figure 3 is a sectional plan on the line 3—3 of Figure 2 illustrating on a larger scale the connection through which oil is supplied to the replenishing chamber of each of the shock absorbers.

Figure 4 is a sectional view showing a part of Figure 1 on a larger scale.

Referring to the drawing, each shock absorber comprises a cylindrical casing $a$ provided with an oscillatory vane $b$. This vane is formed on a spindle one end of which extends through one side of the said casing and is fitted with a lever $c$ which is connected to a road wheel axle or one of the vehicle springs, the part $a$ being carried on the underframe of the vehicle. Usually one such shock absorber is provided in association with each of the road wheels of the vehicle. One side of the vane $b$ bears against the inner periphery of the casing $a$ and the other against a radial abutment $d$ in the casing. The chambers on the opposite sides of the vane and abutment are interconnected by a restricted passage $e$ which is controlled by a valve. In the example illustrated the valve is represented by $f$ and is adjustable by fluid pressure in the manner to be hereinafter described. The part $a$ is surrounded by a shell $g$ forming an annular replenishing chamber, and the oil (or other fluid used in the absorber) can pass to the part $a$ at either side of the vane through non-return valves $h$ mounted in radially disposed openings formed in the lower portion of the cylindrical wall of the casing $a$, as shown in Figure 2.

According to one form of my invention and as illustrated in Figure 1, I combine with one of the shock absorbers a pump $i$. This may be of any convenient form. For example, it may consist as shown in Figure 1 of an oscillatory vane 10 in a cylindrical enclosure on one end of the spindle of the shock absorber, but in all cases its movable part is actuated by the movable part of the shock absorber.

The supply pipe $j$ of the pump is connected to an oil (or other fluid) container $k$ and the delivery pipe $l$ is connected to a fitting $m$ to which are connected a plurality of pipes $n$ leading to the replenishing chambers of the several shock absorbers. Figure 1 shows pipes $n$ connected to two shock absorbers, and a third pipe which would be connected to other pipes leading to two or more other shock absorbers. A fourth pipe $o$ is a return pipe leading back to the container $k$ through a non-return valve $p$ suitably loaded by a spring $q$.

Each pipe $n$ is connected to a junction $r$ in each of the replenishing chambers. Oil issuing from the pipe passes (in the example illustrated) through a hole $s$ to a filter plug $t$ and thence through a passage which is restricted by a plug $u$ to a pipe $v$ leading to the lower part of the replenishing chamber. With the charging of oil into the replenishing chamber the entrapped air in the upper part of the chamber becomes compressed. When this pressure exceeds a predetermined amount, and while the pump is at rest excess oil is returned to the supply system through a release valve $z$ and hole 13 by the air pressure in the replenishing chamber. Also continued action of the pump causes fluid to be returned to the container $k$ through the pipe $o$ and valve $p$.

In the example illustrated the valve $f$ above described is automatically actuated by the pressure of the fluid supplied by the pump. The oil entering the fitting $r$ is allowed to pass not only to the pipe $v$ but also through a hole $w$ to one end of the chamber containing the valve $f$. The pressure of the oil moves the valve in the direction for restricting the passage $e$ and a spring $x$ moves the valve in the opposite direction. Oil leaking past the valve can return to the replenishing chamber through a duct 2. To regulate the action of the fluid pressure on the valve $f$, a valve 3 controlled by a hand operated lever 4 is combined with the container. Closing of this valve causes the full pump pressure (which is then limited only by the pressure of the spring $q$ on the valve $p$) to act on the valve $f$. On opening the valve 3 fully the oil pressure is released and the pump discharges freely to the container through the passage 11. Intermediate conditions are obtained by suitable adjustment of the valve 3 which is effected by the driver.

I have also shown in Figure 1 another pipe 6 through which oil can be supplied for lubricating various movable parts of the vehicle, such as spring shackles, brake mechanism bearings and the like. The amount of oil supplied for lubrication can be controlled at the will of the driver by a valve 7 which is adjustable by a lever 8. When the valve 7 is open it establishes communication between the pipes o and 6. A spring loaded valve 12 controlling communication between the pipe 6 and container k limits the oil pressure in the pipe 6.

Having thus described my invention what I claim as new and desire to secure by Letters Patent is:—

1. A hydraulic shock absorber system for motor vehicles, comprising the combination of a plurality of shock absorbers, a pump operatively associated with one of the shock absorbers, a fluid container, means whereby fluid from the container can be supplied by the pump to all of the shock absorbers, a spring loaded valve controlling communication between the delivery side of the pump and the container, and a hand-operated valve for by-passing the spring loaded valve, substantially as described.

2. A hydraulic shock absorber system for motor vehicles, comprising the combination of a plurality of shock absorbers each having a fluid-replenishing chamber, a pump operatively associated with one of the shock absorbers, a fluid container communicating with the inlet side of the pump, a fitting connected to the delivery side of the pump, to each fluid-replenishing chamber, and to the container, a spring loaded valve controlling communication between the fitting and the container, and a hand-operated valve for by-passing the spring loaded valve, substantially as described.

3. A hydraulic shock absorber system as claimed in claim 1 and comprising a pipe connected to the container for supplying lubricating oil to various parts of the vehicle, and a hand-operated valve controlling communication between the pipe and the delivery side of the pump, substantially as described.

HERBERT WINCHESTER PITT.